United States Patent
Cheng et al.

(10) Patent No.: US 10,610,877 B2
(45) Date of Patent: Apr. 7, 2020

(54) RUBBER FIXING APPARATUS AND COATER (71) Applicants: BOE Technology Group Co., Ltd., Beijing (CN); Hefei Xinsheng Optoelectronics Technology Co., Ltd., Anhui (CN)

(72) Inventors: Lu Cheng, Beijing (CN); Haitao Long, Beijing (CN); Feiji Zhou, Beijing (CN); Xiaodong Yang, Beijing (CN); Haitao Bai, Beijing (CN); Wenxi Zhu, Beijing (CN); Xu Xu, Beijing (CN); Lin Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/964,704

(22) Filed: Apr. 27, 2018

(65) Prior Publication Data
US 2019/0054490 A1 Feb. 21, 2019

(30) Foreign Application Priority Data
Aug. 17, 2017 (CN) .................. 2017 2 1033036 U (51) Int. Cl.
*B05B 15/50* (2018.01)
*G02F 1/13* (2006.01)
*B05B 15/522* (2018.01)
*G02F 1/1335* (2006.01)

(52) U.S. Cl.
CPC ............ *B05B 15/50* (2018.02); *B05B 15/522* (2018.02); *G02F 1/1303* (2013.01); *G02F 1/133516* (2013.01)

(58) Field of Classification Search
USPC ....... 118/300, 302; 211/49.1, 59.2, 59.3, 65, 211/119.005
See application file for complete search history.

(56) References Cited

FOREIGN PATENT DOCUMENTS

CN 101190741 A * 6/2008

OTHER PUBLICATIONS

English Translation CN 101190741A, Jun. 2008 (Year: 2008).*

* cited by examiner

*Primary Examiner* — Yewebdar T Tadesse
(74) *Attorney, Agent, or Firm* — Westman, Champlin & Koehler, P.A.

(57) ABSTRACT

A rubber fixing apparatus and a coater are provided. The rubber fixing apparatus includes: a storing device, in which a cavity configured to receive at least one rubber and an outlet communicated with the cavity are provided; and a fixing structure provided on the storing device and outside the cavity. The rubber is moved from the cavity through the outlet in a first direction and is fixed to the fixing structure.

17 Claims, 7 Drawing Sheets

RUBBER FIXING APPARATUS AND COATER

CROSS-REFERENCE TO RELATED APPLICATION

This application claims the benefit of Chinese Patent Application No. 201721033036.5 filed on Aug. 17, 2017 in the State Intellectual Property Office of China, the whole disclosure of which is incorporated herein by reference.

BACKGROUND OF THE INVENTION

Field of the Invention

At least one embodiment of the present disclosure relates to the field of display manufacturing technology, and in particular relates to a rubber fixing apparatus and a coater.

Description of the Related Art

In the process of manufacturing liquid crystal displays (LCDs), during an LCD passing through a color filter production line, it is often necessary to coat relevant materials of film layers of the LCD with a relevant apparatus such as a coater. After the coating process, however, some residue wastes are often remained on nozzles of the coater. Then, it is necessary to erase these residue wastes by using a rubber mounted on the coater, i.e., nozzle cleaning, in order to avoid affecting a yield rate of the LCD.

In the relevant art, there is provided a rubber fixing apparatus, comprising a fixing frame on which a rubber for cleaning a nozzle is mounted, thereby erasing the residue wastes from the nozzle.

In the actual production process of the color filter production line, the rubber is used frequently, and it is often necessary to replace the rubber every three days. However, when replacing the rubber in the relevant art, it is necessary for a worker to get a new rubber first, and then disassemble the old rubber. As a result, the replacement takes a long time, and a long-time operation at the production line reduces the safety thereof.

SUMMARY OF THE INVENTION

At least one embodiment of the present disclosure provides a rubber fixing apparatus and a coater.

According to an embodiment in a aspect of the present disclosure, it provides a rubber fixing apparatus comprising: a storing device, in which a cavity configured to receive at least one rubber and an outlet communicated with the cavity are provided; and a fixing structure provided on the storing device and outside the cavity, the rubber being moved from the cavity through the outlet in a first direction and is fixed to the fixing structure.

The rubber fixing apparatus according to an embodiment of the present disclosure further comprises a pusher mounted in the storing device and configured to push the rubber out of the outlet.

According to the rubber fixing apparatus of an embodiment of the present disclosure, a through slot is provided inside the storing device and is at least partially communicated with the cavity, the pusher being provided in the through slot in such a manner that the pusher extends in a second direction perpendicular to the first direction.

According to the rubber fixing apparatus of an embodiment of the present disclosure, the pusher is configured to be held in a locked position relative to the through slot whenever the pusher pushes a group of rubbers out of the outlet.

According to the rubber fixing apparatus of an embodiment of the present disclosure, a plurality of grooves are provided in an inner wall of the through slot and arranged at equal intervals in the first direction and extend in the second direction; the pusher comprises: a main body extending in the second direction; and a moving bar mounted on the main body and detachably mated with the groove so as to hold the pusher in the locked position relative to the through slot.

According to the rubber fixing apparatus of an embodiment of the present disclosure, there are two moving bars, which are provided on opposite sides of the pusher facing the inner walls of the through slot and extend in the second direction.

According to the rubber fixing apparatus of an embodiment of the present disclosure, the pusher further comprises a fixed end portion mounted on the main body and outside the storing device, a width of the fixed end portion in a third direction perpendicular to the first and second directions being greater than a width of the through slot so as to restrict the pusher from moving in the second direction.

According to the rubber fixing apparatus of an embodiment of the present disclosure, at least one end of each moving bar extends out of the fixed end portion of the pusher so as to pull the moving bar out of the through slot and release the locked state between the moving bar and the groove.

According to the rubber fixing apparatus of an embodiment of the present disclosure further comprises a first driving device configured to drive the pusher to move in the first direction.

According to the rubber fixing apparatus of an embodiment of the present disclosure, the fixing structure comprises: a fixed block that is fixed on the storing device at one side of the outlet; and a sliding block that is connected slidably to the storing device on the other side of the outlet, and is configured to slide relative to the fixed block and to be mated with the fixed block so as to clamp and fix the rubber.

According to the rubber fixing apparatus of an embodiment of the present disclosure, wherein a guide groove extending in the second direction perpendicular to the first direction is provided on one of the sliding block and the storing device, and a guide protrusion is provided on the other of the storing device and the guide protrusion, the guide protrusion being at least partially engaged into the guide groove so as to guide the sliding block to slide along the second direction.

According to the rubber fixing apparatus of an embodiment of the present disclosure, an elastic member is provided at the middle of the guide groove, and is adapted to position the guide protrusion relative to the guide groove when the guide protrusion slides to either end of the guide groove; and the elastic member is further used to allow the guide protrusion to slide between opposite ends of the guide groove when the elastic member is pressed to deform elastically.

According to the rubber fixing apparatus of an embodiment of the present disclosure, a second driving device is provided on the sliding block and adapted to drive the sliding block to move.

According to the rubber fixing apparatus of an embodiment of the present disclosure, a positioning column is provided on at least one of the fixed block and the sliding block, and a positioning hole is provided in the rubber, the positioning column being adapted to insert into the positioning hole so as to fix the rubber.

According to the rubber fixing apparatus of an embodiment of the present disclosure, the storing device is provided with a plurality of cavities and a plurality of outlets, and there are a plurality of fixing structures that are in one-to-one correspondence with the plurality of cavities, the positioning columns provided on a plurality of fixed blocks or sliding blocks being different from each other in number and/or position.

According to the rubber fixing apparatus of an embodiment of the present disclosure, the plurality of cavities include a first cavity and a second cavity, and the outlets include a first outlet and a second outlet communicated with the first cavity and the second cavity, respectively, the fixed block and the sliding block for the first cavity being provided on opposite sides of the first outlet; and wherein the fixed block and the sliding block for the second cavity are provided on opposite sides of the second outlet.

According to the rubber fixing apparatus of an embodiment of the present disclosure, each of the fixed blocks and each of the sliding blocks are provided obliquely; and on the sliding block at the first outlet is provided with the positioning column, and on the fixed block at the second outlet is provided with another positioning column.

According to the rubber fixing apparatus of an embodiment of the present disclosure further comprises a base plate, on which the storing device is mounted, and in which at least one mounting hole is provided for installing the base plate.

According to an embodiment in another aspect of the present disclosure, it provides a coater comprising: the rubber fixing apparatus according to any one of the aforementioned embodiments; and a mounting table, on which the rubber fixing apparatus is detachably mounted.

BRIEF DESCRIPTION OF THE DRAWINGS

In order to more clearly illustrate the technical solutions of the present disclosure or relevant art, hereinafter it will briefly describe the drawings needed to be used in the embodiments. It can be seen that the drawings in the following description are merely some embodiments of the present disclosure. An ordinary person skilled in the art, without any inventive work, may further obtain other drawings based on these drawings.

DETAILED DESCRIPTION OF PREFERRED EMBODIMENTS OF THE INVENTION

Hereinafter the technical solutions in the present disclosure will be clearly and completely described with reference to the drawings in the embodiments of the present disclosure. Obviously, the described embodiments are merely a part of, rather than all of the embodiments of the present disclosure. All other embodiments obtained by an ordinary person skilled in the art, without any inventive work, based on the embodiments in the present disclosure will fall within the scope of the present disclosure.

In the description of the embodiments of the present disclosure, it should be understood that orientations or position relations indicated by terms 'center', 'upper', 'lower', 'front', 'back', 'left', 'right', 'vertical', 'horizontal', 'top', 'bottom', 'inner', 'outer' and the like are based on the orientations or position relations shown in the drawings, and are merely for the convenience of describing the embodiments and simplifying the description, rather than indicating or implying that the apparatus or elements referred to have a particular orientation, or be constructed and operated in the particular orientation. Therefore, it should not be construed as a limitation to the scope of the present disclosure.

Terms 'first' and 'second' are merely for the purpose of description, and should not be construed as indicating or implying relative importance or implicitly indicating the number of technical features referred to. Thus, features defined with 'first', 'second' may explicitly or implicitly include one or more of the features. In the description of the embodiments of the present disclosure, the meaning of 'plurality' is two or more, unless otherwise specified.

In the description of the embodiments of the present disclosure, it should be noted that terms 'mount', 'connect', and 'connection' should be interpreted broadly, unless specifically defined or limited otherwise, for example, it may be a fixed connection, or a detachable connection, or an integral connection. An ordinary person skilled in the art can understand the specific meaning of the aforementioned terms in the context of the embodiments of the present disclosure.

In addition, in the following detailed description, for the purpose of explanation, numerous specific details are set forth in order to provide a thorough understanding of the embodiments of the present disclosure. However, it is obvious that one or more embodiments can be implemented without these specific details. In other instances, well-known structures and devices are schematically shown so as to simplify the drawings.

Figure 1:
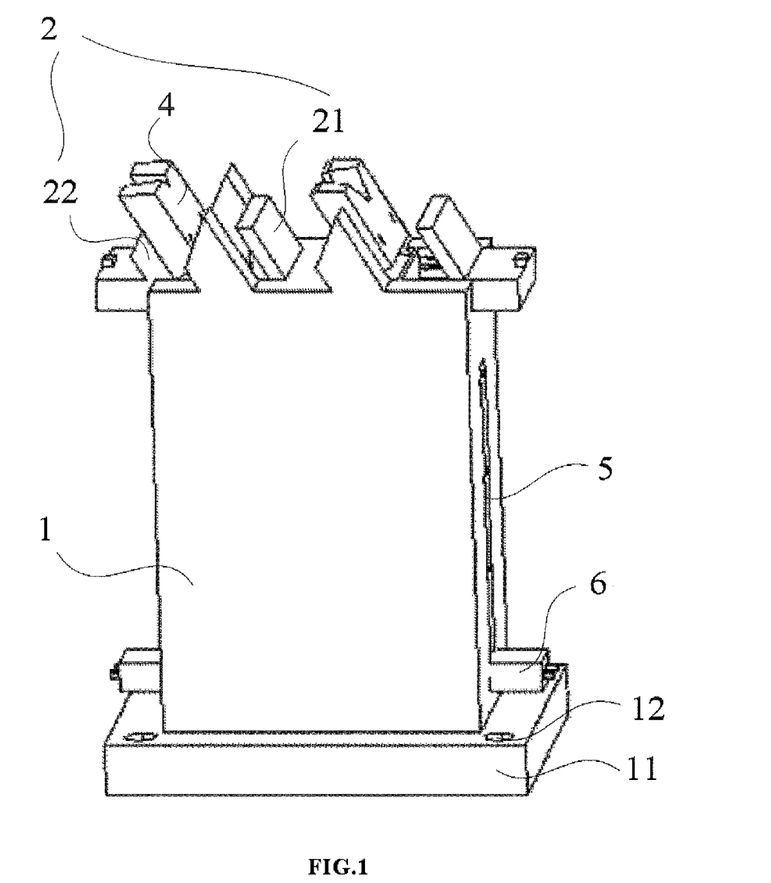
FIG. 1 is a schematic perspective view of a rubber fixing apparatus according to an exemplary embodiment of the present disclosure.
Figure 2:
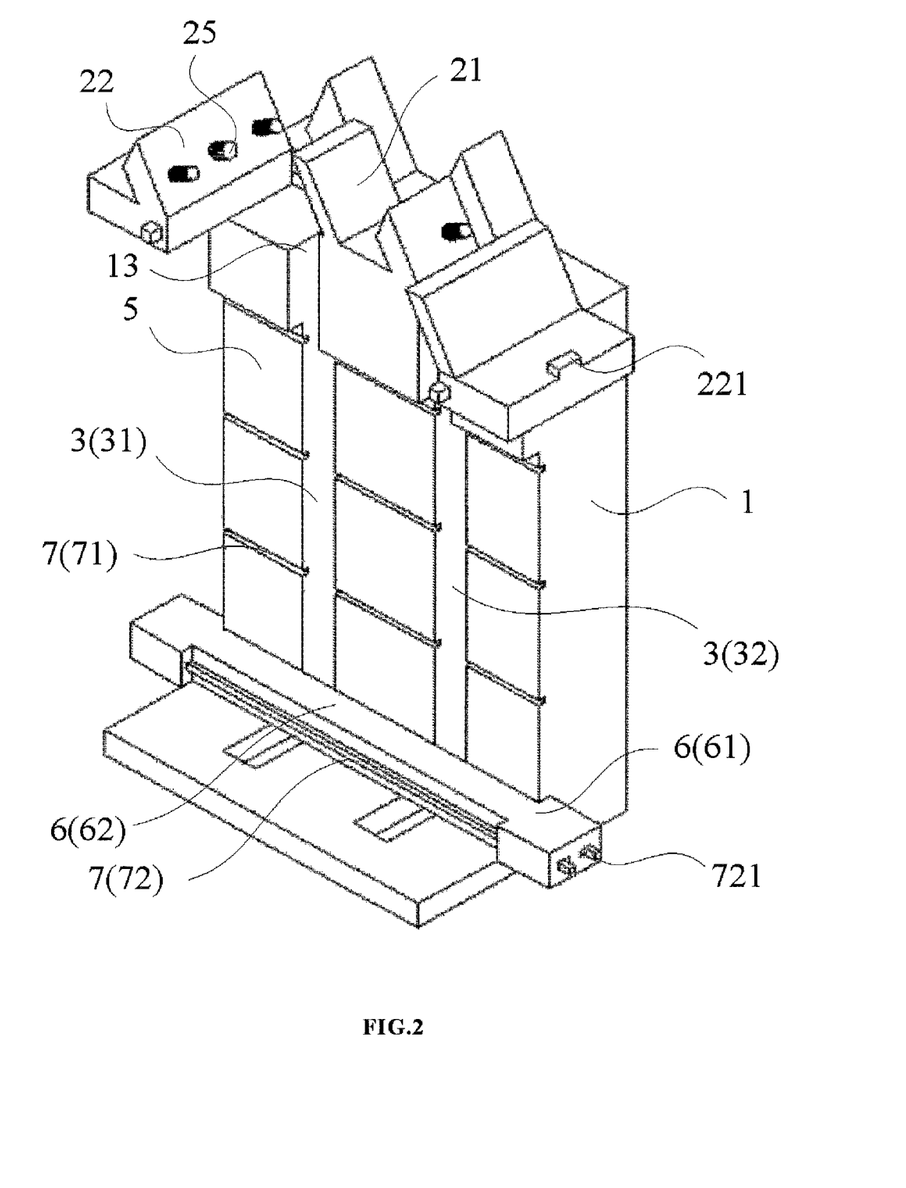
FIG. 2 is a schematic perspective view of the rubber fixing apparatus shown in FIG. 1 for mounting the rubber while a part of the storing device has been removed.
Figure 3:
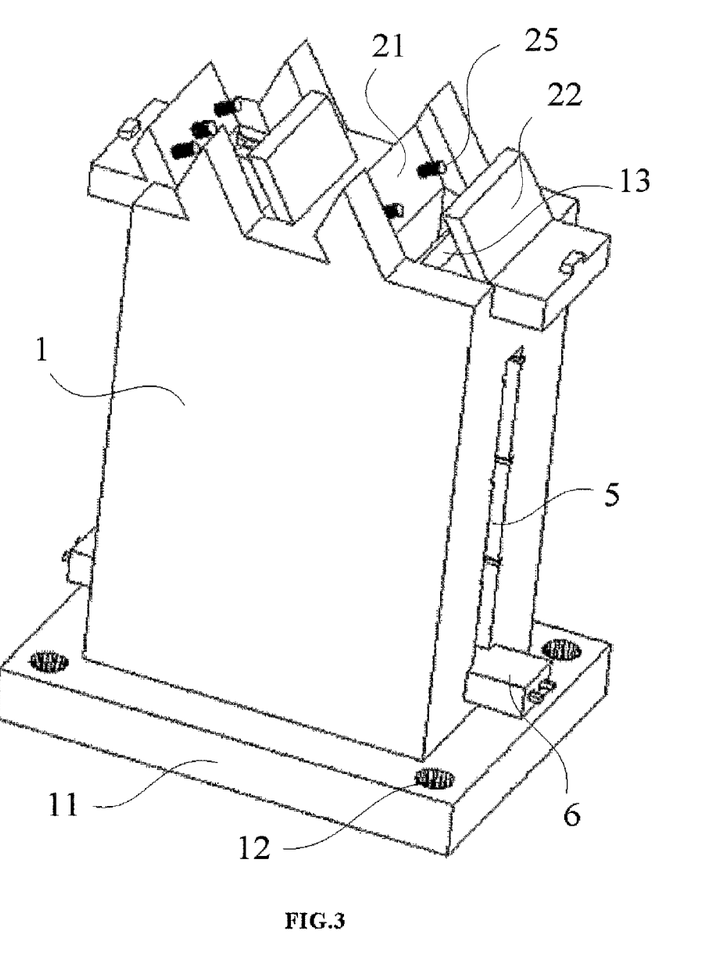
FIG. 3 is a schematic perspective view of the rubber fixing apparatus shown in FIG. 1 when no rubber has been mounted.

An embodiment of the present disclosure provides a rubber fixing apparatus, which is adapted to a rubber for cleaning a nozzle of a coater during the manufacture of LCDs, for example. As shown in FIG. 1, FIG. 2 and FIG. 3, the rubber fixing apparatus comprises a storing device 1 and a fixing structure 2. The storing device 1 is provided with a cavity 3 and an outlet 13 communicated with the cavity. The cavity 3 is used to accommodate at least one rubber 4. The fixing structure 2 is provided on the storing device 1 and outside the cavity 3. The rubber 4 is moved from the cavity 3 of the storing device through the outlet 13 in a first direction (an up-down direction or a height direction shown in FIG. 1) and is fixed to the fixing structure 2.

The rubber fixing apparatus according to the embodiment of the present disclosure comprises the storing device 1 and the fixing structure 2. The storing device 1 is provided with the cavity 3, and the rubber 4 accommodated in the cavity 3 moves through the outlet 13 of the storing device 1 and is fixed to the fixing structure 2. Thus, before the rubber fixing apparatus is operated, a new rubber 4 is placed in the cavity 3 in advance. When the rubber 4 needs to be replaced, an old rubber 4 mounted on the rubber fixing apparatus is removed, the new rubber 4 is driven to protrude from the cavity 3, and then the new rubber 4 outside the cavity 3 is fixed by the fixing structure 2 provided on the storing device 1 and outside the cavity 3, completing the replacement of the rubber 4. Thus, when replacing the rubber 4, without obtaining a new rubber 4 from the outside of the rubber fixing apparatus, the rubber 4 inside the cavity 3 is directly driven to protrude and then is fixed by the fixing structure 2, completing the replacement. It takes a relatively shorter time, so that the replacement of the rubber becomes more convenient and quick, and it is safer to replace the rubber on the production line of LCDs in a short time.

In order to facilitate to allow the new rubber 4 to protrude out of the cavity 3 through the outlet 13 and to be fixed by the fixing structure 2 so as to replace of the rubber 4, as shown in FIG. 2, a through slot 5 is provided inside of the storing device 1. The through slot 5 is at least partially in communication with the cavity 3, and extends along the first direction from the bottom of the cavity 3 towards the fixing structure 2. A pusher 6 is provided in the through slot 5 in such a way that it extends in a second direction perpendicular to the first direction (a left-right direction or a length direction in FIG. 1). The pusher 6 is adapted to drive the rubber 4 to move in the first direction. Thus, when it is necessary to drive the new rubber 4 to protrude out of the cavity 3, the pusher 6 moves along the first direction, i.e., moves along the up-down direction from the bottom of the cavity 3 toward the fixing structure 2, thereby pushing the rubber 4 inside the cavity 3 to move out of the cavity 3 so as to be fixed by the fixing structure 2.

When the pusher 6 pushes the rubber 4 to protrude out of the cavity 3 through the outlet 13, the fixing structure 2 is operated to fix the rubber 4. During fixing the rubber 4, it is necessary to operate the fixing structure 2 manually or automatically. In an embodiment, the relative position of the pusher 6 and the cavity 3 is fixed, which is advantageous for fixing the position of the rubber 4. For ease of the operation, as shown in FIG. 2, the cavity 3 is provided to accommodate at least one rubber 4. The usher 6 is configured to be held in a locked position relative to the through slot 5 whenever the pusher 6 pushes a group of rubbers out of the outlet 13. For example, a positioning structure 7 is provided between the pusher 6 and the inner wall of the through slot 5. Thus, the positioning structure 7 may lock the relative position of the pusher 6 and the through slot 5 whenever the pusher 6 pushes a rubber 4 out of the cavity 3. Thus, the operation of the pusher 6 during manually operating the fixing structure 2 is avoided, so that the operation of fixing the rubber becomes more convenient.

It should be noted that in the production of LCDs, the replacement frequency of the rubber 4 is generally high. Therefore, in order to meet the need of replacing the rubber 4 for multiple times, the cavity 3 is formed to accommodate a plurality of rubbers 4 at one time. Thus, it is possible to meet the need of replacing the rubbers 4 for multiple times by mounting and fixing a rubber fixing apparatus, which comprises a storing device, on the coater at one time, without obtaining new rubbers 4 from the outside of the rubber fixing apparatus, further facilitating the replacement of the rubber 4. Meanwhile, by using the positioning structure to hold the pusher 6 in a locked position relative to the through slot 5, it is possible to guarantee that, when the plurality of rubbers 4 are accommodated in the cavity 3, the pusher 6 may keep supporting the rubber 4 when the fixing structure 2 fixes the rubber 4, facilitating the fixing of the rubber 4.

Figure 5:
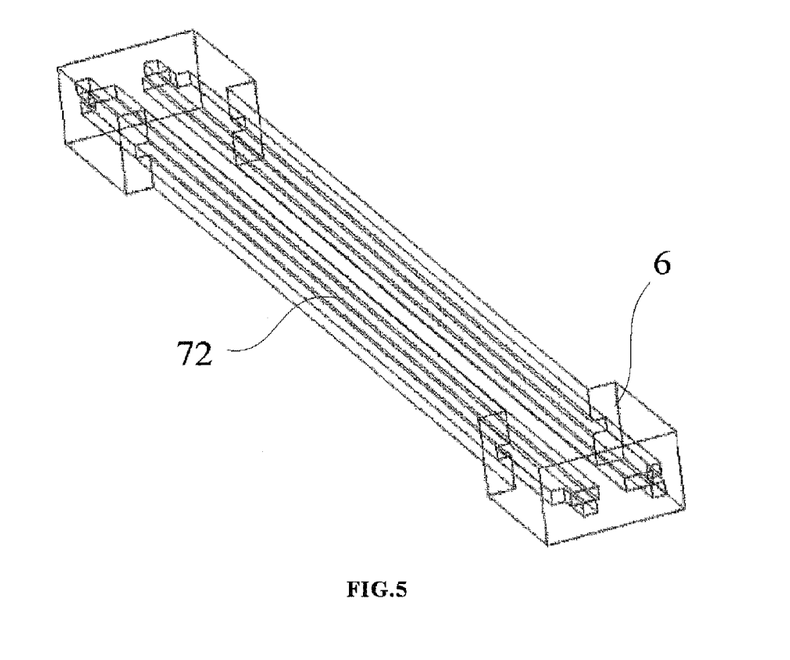
FIG. 5 is a schematic perspective view of a moving bar provided on a pusher of a rubber fixing apparatus according to an embodiment of the present disclosure.
Figure 6:
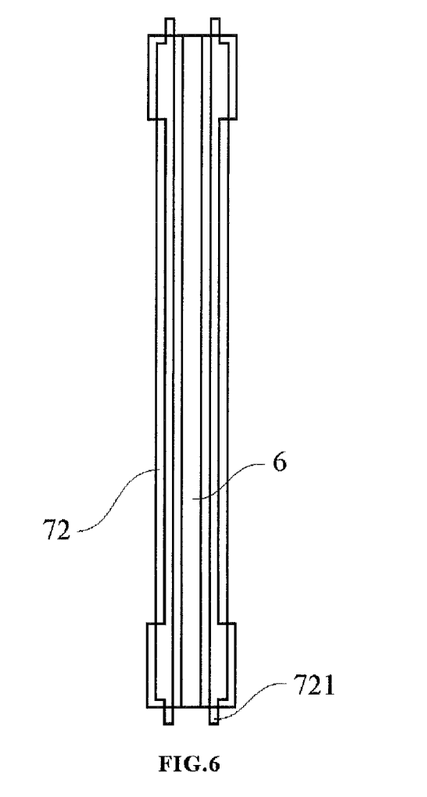
FIG. 6 is a schematic plan view of a moving bar provided on a pusher of a rubber fixing apparatus according to another embodiment of the present disclosure.

It will be understood that there may be various implementations of the positioning structure 7, such as a gear structure and a sliding track structure, by which the pusher 6 may be held in a locked position relative to the through slot 5 whenever the pusher 6 pushes a rubber 4 out of the cavity 3. In an exemplary embodiment, as shown in FIG. 2, FIG. 5 and FIG. 6, the positioning structure 7 comprises an implementation that combines grooves 71 and a moving bar 72. In particular, a plurality of grooves 71 are provided in the inner wall of the through slot 5, which are arranged at equal intervals in the first direction and extend in the second direction. The pusher 6 comprises a main body 62 extending in the second direction and the moving bar 72 mounted on the main body 62. The moving bar 72 inserts into the groove 71 and detachably mated with the groove 71 so as to hold the pusher 6 in a locked position relative to the through slot 5, thereby preventing further movement of the pusher 6 relative to the through slot 5.

It should be noted that the moving bar 72 may be made of a material that is inherently elastic, or may be provided with elastic member(s) inside the pusher 6, so as to ensure that the moving bar 72 may enter the groove 71 smoothly when the moving bar 72 moves to the groove 71 along with the pusher 6. On the other hand, when the moving bar 72 is required to be disengaged from the groove 71, the elastic moving bar or the elastic member(s) provided inside the pusher 6 is elastically deformed by an external force so as to allow the moving bar 72 to be disengaged from the groove 71.

Figure 4:
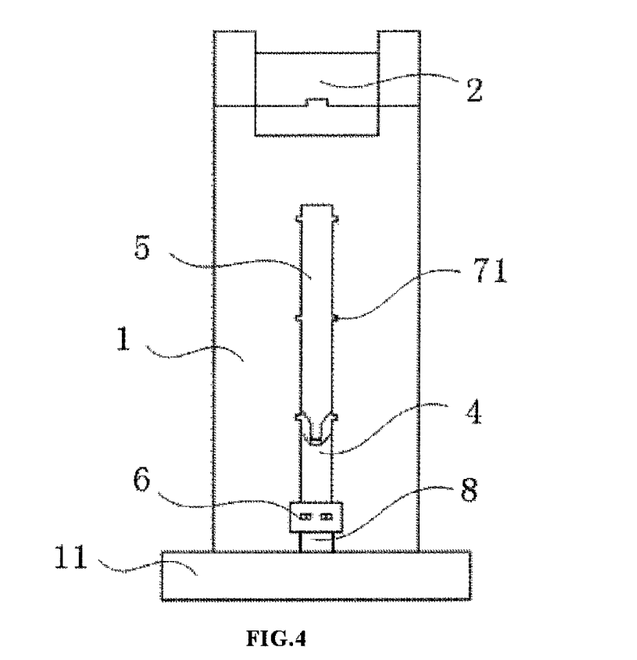
FIG. 4 is a side view of FIG. 3.

In order to make the pusher 6 more balanced and stable when it is held in the locked position relative to the through slot 5, with reference to FIG. 5 and FIG. 6, two moving bars 72 are provided on opposite sides of the pusher 6 facing the inner walls of the through slot 5 and extend in the second direction. Referring to FIG. 4, the plurality of grooves 71 are provided on two inner walls of the through slot 5 facing the pusher 6. By detachably mating the moving bars 72 provided on opposite sides of the pusher 6 facing the inner walls of the through slot 5 with the grooves 71 provided on two inner walls of the through slot 5 facing the pusher 6, the opposite sides of the pusher 6 are subjected to force equally when the pusher 6 is in the locked position relative to the through slot 5, and thus more balanced and stable.

In order to facilitate the detachment of the moving bar 72 from the groove 71 by an external force so as to guarantee that the pusher 6 smoothly pushes the rubber 4 to move when the rubber 4 is replaced next time, with reference to FIG. 2, the pusher 6 further comprises a fixed end portion 61 mounted on the main body 62 and outside the storing device 1. The main body 62 is positioned in the through slot 5. A width of the fixed end portion 61 in a third direction (a width direction) perpendicular to the first and second directions is greater than a width of the through slot 5 so as to restrict the pusher 6 from moving relative to the through slot in the second direction.

In an embodiment, as shown in FIG. 2, FIG. 5 and FIG. 6, at least one end of each moving bar 72 extends beyond the fixed end 61 of the pusher 6 so as to facilitate pulling the moving bar 72 out of the through slots 5, thereby releasing the locked state between the moving bar 72 and the groove 71 so as to allow the pusher 6 to move relative to the through slot 5. Portions of the moving bars 72 on opposite sides of the main body 62 of the pusher, which extend beyond the fixed end 61, are used as operating ends 721. Because the operating end 721 extends beyond the fixed end 61, the operating end 721 may be operated conveniently when the moving bar 72 needs to be disengaged from the groove 71.

It could be understood by those skilled in the art that there are various ways to achieve the operation of the operating end 721 of the moving bar. For example, the operating ends 721 of the two moving bars 72 may be operated to move in the same direction so that the moving bars 72 are disengaged from the grooves 71. Alternatively, the operating ends 721 of the two moving bars 72 may be operated to move in opposite directions so that the moving bars 72 are disengaged from the grooves 71. In the implementation in which the operating ends 721 move in the same direction so that the moving bars 72 are disengaged from the grooves 71, the operating ends 721 of the two moving bars 72 extend in parallel beyond the same fixed end 61. In the implementation in which the operating ends 721 move in opposite directions so that the moving bars 72 are disengaged from the grooves 71, the operating ends 721 of the two moving bars 72 extend beyond two opposite fixed ends 61, respectively.

In an exemplary embodiment, as shown in FIG. 4, the rubber fixing apparatus further comprises a first driving device 8 configured to drive the pusher 6 to move in the first direction. For example, the first driving device 8 may include any one of a stepping motor, a pneumatic cylinder, a hydraulic cylinder, and an electromagnetic pull-in mechanism. The motion of the first driving device 8 may be controlled so that the driving of the pusher 6 is stopped whenever the pusher 6 pushes a rubber 4 out of the cavity 3. Thus, the pusher 6 may be held in a fixed position relative to the through slot in order to fix the rubber 4 on the fixing structure 2. It can be understood that the first driving device 8 may be provided outside the storing device so as to drive at least one of the two fixed ends 61 of the pusher 6. Alternatively, the first driving device 8 may be provided inside the storing device so as to drive the middle of the pusher 6.

The fixing structure 2 may fix the rubber 4 in various ways, such as screw fixation and snap-fitting, and the like. In order to facilitate disassembly, as well as to facilitate fixing of the rubber 4 protruding out of the cavity 3 through the outlet 13, in an exemplary embodiment, as shown in FIG. 1 to FIG. 3, FIG. 7 and FIG. 8, the fixing structure 2 comprises a fixed block 21 and a sliding block 22 that is slidable relative to the fixed block 21. The fixed block 21 is fixed to the storing device 1 on a side of the outlet 13. The sliding block 22 is slidably connected to the storing device 1 on the other side of the outlet 13, and is configured to slide toward the fixed block 21 and to be mated with the fixed block 21 when the rubber 4 protrudes out of the outlet 13, thereby clamping and fixing the rubber 4. Thus, the rubber 4 outside the outlet 13 may be easily clamped and fixed by sliding the sliding block 22 toward the fixed block 21.

Figure 7:
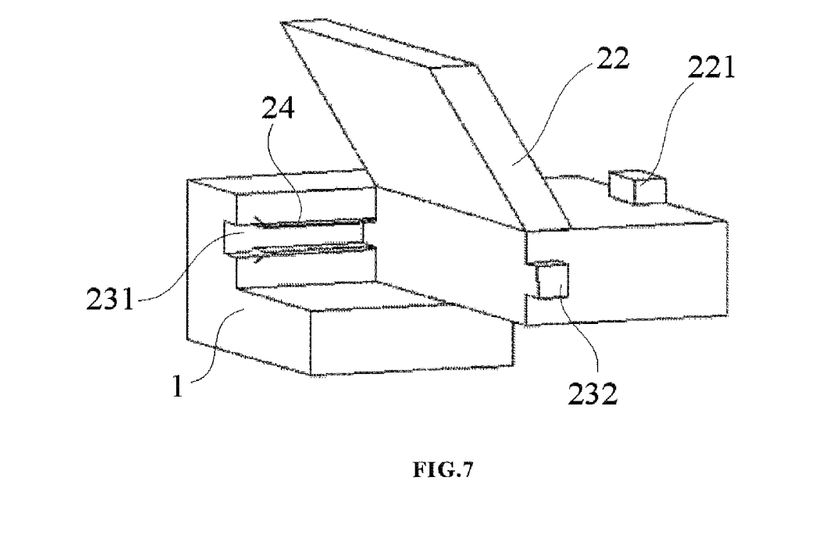
FIG. 7 is a schematic view of a sliding connection of a sliding block and a storing device of a rubber fixing apparatus according to an embodiment of the present disclosure.
Figure 8:
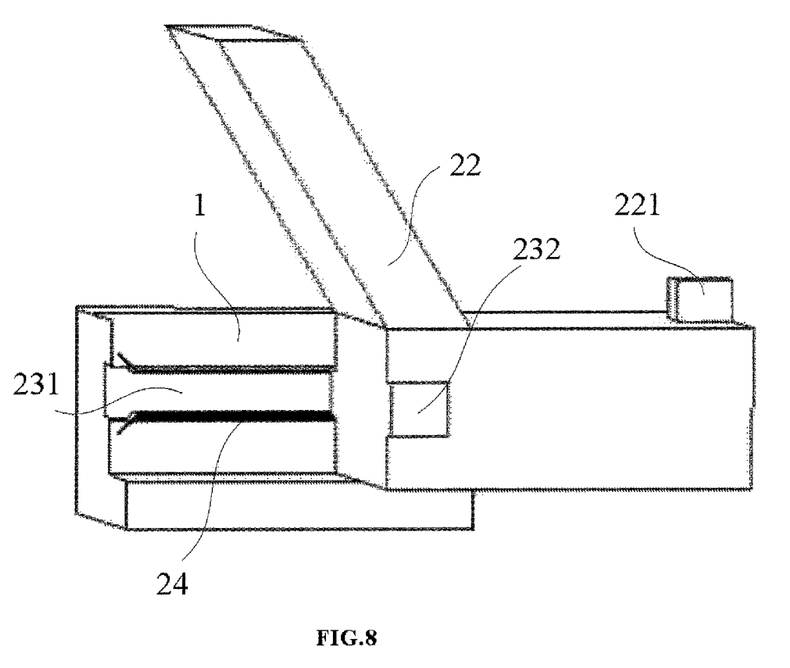
FIG. 8 is another schematic view of the sliding connection of the sliding block and the storing device of the rubber fixing apparatus shown in FIG. 7.

In an embodiment, in order to achieve sliding of the sliding block 22 along the storing device 1 in the second direction, a guide groove extending along the second direction (i.e., a length direction) perpendicular to the first direction (i.e., a height direction) is provided on one of the sliding block 22 and the storing device 1, while a guide protrusion is provided on the other of the sliding block 22 and the storing device 1 so as to guide the sliding block 22 to slide along the second direction. As shown in FIG. 7 and FIG. 8, the fixing structure 2 further comprises a guide structure 23 including a guide groove 231 and a guide protrusion 232. The guide groove 231 extends toward the fixed block 21 in the second direction and is provided on the storing device 1. The guide protrusion 232 is provided on the sliding block 22. The guide protrusion 232 is at least partially engaged within the guide groove 231 and is slidable along the guide groove 231 in the first direction. Because the guide protrusion 232 is provided on the sliding block 22, the guide groove 231 is provided on the storing device 1. By sliding the guide protrusion 232 along an extending direction of the guide groove 231, the sliding block 22 may be guided to slide along the storing device 1.

Referring to FIG. 7 and FIG. 8, when the sliding block 22 slides to one end of the guide groove 231 toward the fixed block 21, the sliding block 22 and the fixed block 21 clamp and fix the rubber 4; when the sliding block 22 slides away from the fixed block 21 to the other end of the guide groove 231, the old rubber 4 may be removed, and a new rubber 4 is moved from the cavity 3 through the outlet 13 to the outside of the cavity 3. In the two states as aforementioned, the sliding block 22 may be displaced due to collision, which may in turn affect the replacement of the rubber 4. Therefore, the relative position of the sliding block 22 and the storing device 1 needs to be locked when the sliding block 22 slides to either end of the guide groove 231, avoiding further displacement of the sliding block 22 due to collision and affecting the replacement operation of the rubber 4. Therefore, as shown in FIG. 7 and FIG. 8, an elastic member 24 is provided at the middle of the guide groove 231, and is configured to lock the relative position of the guide protrusion 232 and the guide groove 231 when the guide protrusion 232 slides to either end of the guide groove 231 so as to prevent further displacement of the sliding block 22 relative to the fixed block 21. The elastic member 24 is further configured to allow the guide protrusion 232 to slide between opposite ends of the guide groove 231 when the elastic member 24 is pressed to deform elastically.

It should be noted that the elastic member 24 may be any elastic member, as long as the above function could be achieved. For example, in an exemplary embodiment, referring to FIG. 8, the elastic member 24 comprises an elastic piece. Both ends of the elastic piece are inserted into side walls of the guide groove 231 and are fixed therein. The entirety of the elastic piece is arranged to protrude relative to one inner wall of the guide groove 231 toward the other opposite inner wall thereof. The elastic piece is located in the middle of the guide groove 231, while no elastic member 24 is provided at both ends of the guide groove 231. Thus, when the guide protrusion 232 is moved to either end of the guide groove 231, because the entirety of the elastic piece protrudes relative to the one inner wall of the guide groove 231 toward the other opposite inner wall thereof, the width of the guide groove 231 becomes smaller, so that the guide is prevented from moving from either end of the guide groove 231 toward the middle thereof, i.e., the relative position of the sliding block 22 and the storing device 1 is locked. When the sliding block 22 needs to slide toward the fixed block 21, the guide protrusion 232 applies an external force against the elastic force of the elastic piece to elastically deform the elastic piece so that the width between the two opposite inner walls of the guide groove 231 becomes sufficient to allow the guide protrusion 232 to pass through, thereby allowing the sliding block 22 to slide smoothly toward the fixed block 21.

In order to facilitate the operation of the sliding block 22, as shown in FIG. 7 and FIG. 8, a second driving device 221 is provided on the sliding block 22 to drive the sliding block 22 to move. In an embodiment, the second driving device 221 may be configured as a handle so that the operator manually drives the handle to move the sliding block 22 relative to the fixed block.

It should be noted that the structure of the handle may be various, and it is not limited here, as long as it may be conveniently operated by human hands. In another embodiment, the second driving device 221 may include any one of a stepping motor, a pneumatic cylinder, a hydraulic cylinder, and an electromagnetic pull-in mechanism. The actions of the second driving device 221 may be controlled to drive the sliding block 22 to move relative to the fixed block 21.

Figure 9:
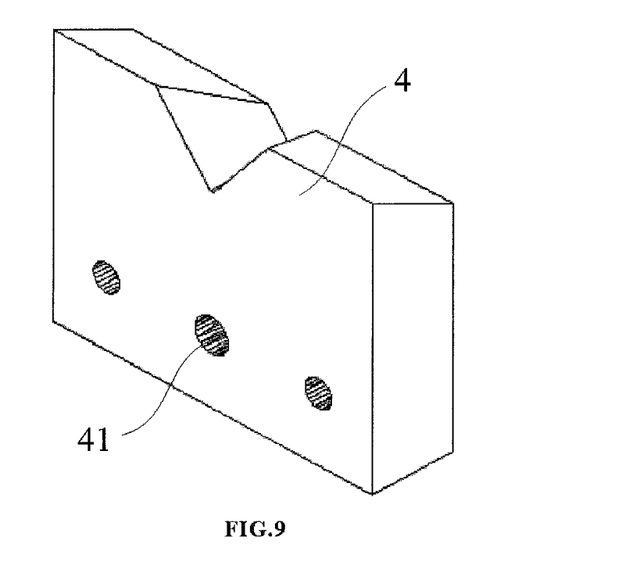
FIG. 9 is a schematic view of a rubber mounted on a rubber fixing apparatus according to an embodiment of the present disclosure.
Figure 10:
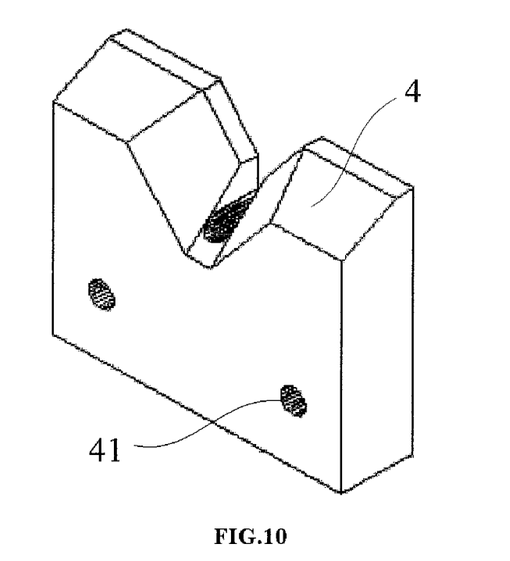
FIG. 10 is a schematic view of a rubber mounted on a rubber fixing apparatus according to another embodiment of the present disclosure.

As described above, the rubber 4 is clamped and fixed by the fixed block 21 and the sliding block 22. Considering that rubber 4 is subjected to large friction for a long time in operation, the rubber 4 needs to be fixed firmly. Therefore, as shown in FIG. 2 and FIG. 3, the fixed block 21 or the sliding block 22 is provided with positioning column(s) 25. Accordingly, as shown in FIG. 9 and FIG. 10, the rubber 4 is provided with positioning hole(s) 41, and the positioning column 25 is configured to be inserted into the positioning hole 41 to fix the rubber 4. As the positioning column 25 is inserted into positioning hole 41, the rubber 4 is not only clamped by the fixed block 21 and sliding block 22, but also restrained by the positioning column 25, thereby enhancing the reliability of the fixing of the rubber. Meanwhile, by means of the 'column-to-hole' mating structure, it is possible to assist the positioning of the rubber during mounting the rubber 4.

During cleaning with the rubber, in order to achieve a good cleaning effect, it is necessary to provide a plurality of rubbers 4 to work simultaneously. Therefore, it is possible to provide a plurality of cavities 3 in the storing device 1 as necessary, and a fixing structure 2 is provided at each cavity 3 so as to accommodate and fix a plurality of rubbers 4 in different positions. In the case where the plurality of cavities 3 and fixing structures 2 are provided, the rubbers 4 fixed at each fixing structure 2 may have different structures according to their specific working positions, so that when the plurality of rubbers 4 in different positions are replaced at the same time, it may result in a mistake in the mounting positions of the rubbers 4 and therefore the rubbers need to be remounted, affecting the work efficiency. Therefore, in order to mount the rubber 4 in different positions correctly, as shown in FIG. 2, the storing device 1 is provided with a plurality of cavities 3 and a plurality of outlets 13, and there are a plurality of fixing structures 2 in one-to-one correspondence with the plurality of cavities 3. The positioning columns 25 provided on the plurality of fixed blocks 21 or sliding blocks 22 are different from each other in number and/or position. Thus, by setting the number and/or position of the positioning columns 25 of the plurality of fixed blocks 21 or sliding blocks 22 to be different from each other, and setting the number and/or position of the positioning holes in the rubbers 4 mounted at each cavity 3, but setting the number and/or position of the positioning columns 25 provided on the fixed blocks 21 or the sliding blocks 22 in one-to-one correspondence with the number and/or position of the positioning holes in the rubbers 4 to be mated, it is possible to distinguish the corresponding rubber 4 for each fixing structure 2 by mating the positioning columns 25 with the positioning holes, avoiding the problem that the rubbers 4 are mounted in wrong positions so that the efficiency is increased.

It can be understood by a person skilled in the art that, in the aforementioned embodiments, the solution designed to avoid mounting the rubber 4 in wrong positions is named a fool proofing (poka-yoke) structure. In the above solution, each fixing structure 2 is provided with positioning column(s) 25 having specific positions and number, so that it can be identified different fixing structures based on the positions or the number of the positioning column(s) 25 thereof, thereby achieving a poka-yoke structure having fool-proofing function. It is also possible not to perform an adjustment to any one of the number and positions of the positioning column(s) 25, but to provide an additional fool proofing structure on the fixed block 21 or the sliding block 22 of the fixing structure 2, and then the above object may also be achieved.

Based on the working principle of the rubber 4 and generally in order to improve the work effect, the rubber 4 often needs to tilt by an angle. In addition, due to the configuration of the fool-proofing structure, such as the structure of the positioning columns 25 and the positioning holes 41 or other structures, it is generally necessary to provide some structures, such as protrusions or grooves between the fixing structure 2 and the rubber 4, so as to distinguish the rubbers 4 with different structures. Thus, these structures located between the fixing structure 2 and the rubber 4 may interfere with rubber 4 protruding out of the cavity 3. Therefore, in order to avoid the interference of the positioning column 25 with the rubber 4 protruding out of the cavity 3, it is necessary to set the positions of the fixed block 21 and the sliding block 22 according to the arrangement of the cavities 3 in the storing device. Hereafter, a solution with two fixing structures 2 will be described in detail as an example.

In an exemplary embodiment, as shown in FIG. 2, the plurality of cavities 3 comprise a first cavity 31 and a second cavity 32 arranged side by side in the first direction. The outlets comprise a first outlet and a second outlet communicated with the first cavity 31 and the second cavity 32, respectively. The fixed block 21 and the sliding block 22 for the first cavity 31 on the left side in FIG. 1 are provided on opposite sides of the first outlet and are both provided obliquely toward the outside of the storing device 1. The sliding block 22 for the first cavity 31 is provided with the positioning column(s) 25. The fixed block 21 and the slidable block 22 for the second cavity 32 on the right side in FIG. 1 are provided on opposite sides of the second outlet and are both provided obliquely toward the inside of the storing device 1. The fixed block 21 for the second cavity 32 is provided with the positioning column(s) 25 for mating with the positioning hole(s) 41 in the rubber 4. Because the fixed block 21 and the sliding block 22 for the first cavity 31 are both provided obliquely toward the outside of the storing device 1, the sliding block 22 on the left side of the storing device 1 in FIG. 1 is arranged away from the first outlet, and therefore providing the positioning column(s) 25 on the sliding block 22 may prevent the positioning column(s) 25 from interfering with rubber 4 protruding out of the cavity 3. Similarly, because the fixed block 21 and the sliding block 22 for the second cavity 32 are both provided obliquely toward the inside of the storing device 1, the fixed block 22 on the right of the storing device 1 in FIG. 1 is arranged away from the second outlet, and therefore providing the positioning column(s) 25 on the fixed block 21 may prevent the positioning column(s) 25 from interfering with the rubber 4 protruding out of the cavity 3.

It should be noted that, regarding the setting of the fool proofing (poka-yoke) structure, it takes the plurality of cavities 3 comprising the first cavity 31 and the second cavity 32 as example. Referring to FIG. 2 and FIG. 3, in an embodiment, there are three positioning columns 25 for the first cavity 31, and there are two positioning columns 25 for the second cavity 32. Referring again to FIG. 9 and FIG. 10, two rubbers 4 are provided respectively with three and two positioning holes, and are accommodated in the first cavity 31 and the second cavity 32 respectively. Because the rubbers 4 in different positions are distinguished by the number of the positioning columns 25, it is possible to prevent rubber 4 from being mounted incorrectly.

Figure 11:
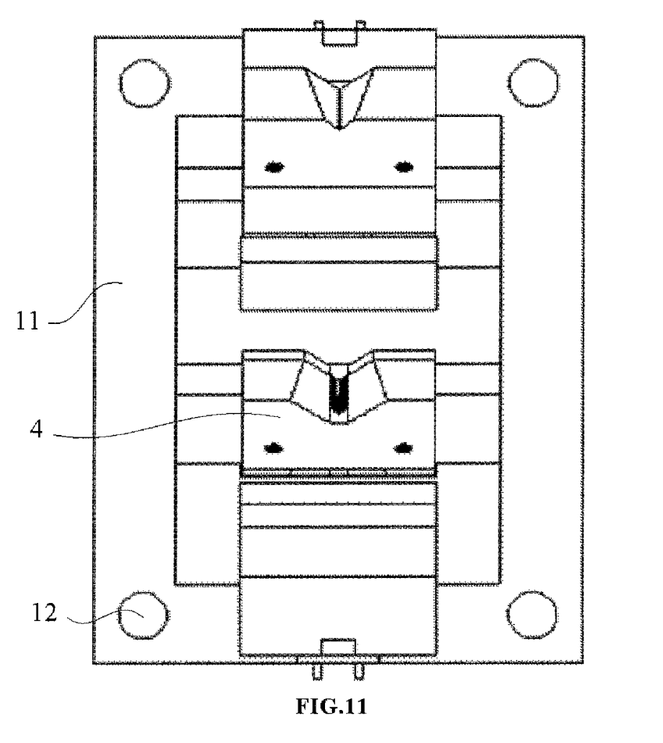
FIG. 11 is a top view of the rubber fixing apparatus shown in FIG. 1.

After operating for a period of time, the rubber fixing apparatus of the present disclosure often results in corrosion or deposition of waste due to chemical articles in the work environment. Therefore, it is necessary to disassemble the rubber fixing apparatus for cleaning or replacement. In order to easily replace the rubber fixing apparatus, as shown in FIG. 11, the rubber fixing apparatus comprises a base plate 11, and the storing device 1 is mounted on the base plate 11. The base plate 11 is provided with at least one mounting hole 12 for mounting the entire base plate 11 on a mounting table of the coater, for example, by means of the mating of bolts and the mounting hole 12.

It should be noted that in order to make the rubber 4 to move smoothly inside the cavity 3, it is possible to perform a guide limit when the rubber 4 moves along the cavity 3. In an embodiment, an inner profile of the cavity 3 is adapted to be mated with an outer profile of the sidewalls of the rubber 4, so that when the rubber 4 moves along and inside the cavity 3, the inner walls of the cavity 3 and the outer walls of the rubber 4 are slidably abut against each other, and the rubber 4 may be guided to move smoothly and stably inside the cavity 3. In another embodiment, a guide limiting slot is provided in the cavity 3, and the rubber 4 is mated with the guide limiting slot. For example, a periphery of the outer profile of the rubber 4 is limited so that the movement process becomes more stable.

Another embodiment of the present disclosure provides a coater comprising: a rubber fixing apparatus as described in any one of the aforementioned embodiments, and a mounting table on which the rubber fixing apparatus is detachably mounted.

In the embodiment of the present disclosure, the coater comprising the aforementioned rubber fixing apparatus has the same advantageous effects and may replace the rubber safely and easily.

The above is merely specific implementations of the present disclosure, but the scope of the present disclosure is not limited to this. Any skilled person familiar with the art may easily conceive various modifications or substitutions within the technical scope disclosed by the present disclosure, all of which should be covered by the scope of the present disclosure. Therefore, the scope of the present disclosure shall be defined by the scope of the claims.

What is claimed is:

1. A rubber fixing apparatus comprising:
    a storing device, in which a cavity configured to receive at least one rubber, and an outlet communicated with the cavity are provided; and
    a fixing structure provided on the storing device and outside the cavity, the at least one rubber being moved from the cavity through the outlet in a first direction and fixed to the fixing structure,
    wherein the fixing structure comprises:
        a fixed block fixed on the storing device at one side of the outlet, and
        a sliding block connected slidably to the storing device on the other side of the outlet, and configured to slide relative to the fixed block and to be mated with the fixed block so as to clamp and fix the at least one rubber, and
    wherein a guide groove extending in the second direction perpendicular to the first direction is provided on One of the sliding block and the storing device, and a guide protrusion is provided on the other of the, storing device and the guide protrusion, the guide protrusion being at least partially engaged into the guide groove to guide the sliding block to slide along the second direction.

2. The rubber fixing apparatus of claim 1, further comprising a pusher mounted in the storing device and configured to push the at least one rubber out of the outlet.

3. The rubber fixing apparatus of claim 2, wherein a through slot is provided inside the storing device and is at least partially communicated with the cavity, the pusher being provided in the through slot in such a manner that the pusher extends in a second direction perpendicular to the first direction.

4. The rubber fixing apparatus of claim 3, wherein the pusher is configured to be held in a locked position relative to the through slot whenever the pusher pushes a group of rubbers out of the outlet.

5. The rubber fixing apparatus of claim 4, wherein a plurality of grooves are provided in an inner wall of the through slot and arranged at equal intervals in the first direction, and extend in the second direction;
    the pusher comprises:
        a main body extending in the second direction; and
        a moving bar mounted on the main body and detachably mated with the groove to hold the pusher in the locked position relative to the through slot.

6. The rubber fixing apparatus of claim 5, wherein there are two moving bars, which are provided on opposite sides of the pusher facing the inner walls of the through slot and extend in the second direction.

7. The rubber fixing apparatus of claim 6, wherein the pusher further comprises a fixed end portion mounted on the main body and outside the storing device, a width of the fixed end portion in a third direction perpendicular to the first and second directions being greater than a width of the through slot so as to restrict the pusher from moving in the second direction.

8. The rubber fixing apparatus of claim 7, wherein at least one end of each moving bar extends out of the fixed end portion of the pusher to pull the moving bar out of the through slot and release the locked state between the moving bar and the groove.

9. The rubber fixing apparatus of claim 1, further comprising a first driving device configured to drive the pusher to move in the first direction.

10. The rubber fixing apparatus of claim 1, wherein an elastic member is provided at the middle of the guide groove, and is adapted to position the guide protrusion relative to the guide groove when the guide protrusion slides to either end of the guide groove; and
    wherein the elastic member is further used to allow the guide protrusion to slide between opposite ends of the guide groove when the elastic member is pressed to deform elastically.

11. The rubber fixing apparatus of claim 1, wherein a second driving device is provided on the sliding block and adapted to drive the sliding block to move.

12. The rubber fixing apparatus of claim 1, wherein a positioning column is provided on at least one of the fixed block and the sliding block, and a positioning hole is provided in the rubber, the positioning column being adapted to insert into the positioning hole to fix the rubber.

13. The rubber fixing apparatus of claim 12, wherein the storing device is provided with a plurality of cavities and a plurality of outlets, and there are a plurality of fixing structures that are in one-to-one correspondence with the plurality of cavities, the positioning columns provided on a plurality of fixed blocks or sliding blocks being different from each other in number and/or position.

14. The rubber fixing apparatus of claim 13, wherein the plurality of cavities include a first cavity and a second cavity, and the outlets include a first outlet and a second outlet communicated with the first cavity and the second cavity, respectively, the fixed block and the sliding block for the first cavity being provided on opposite sides of the first outlet; and wherein the fixed block and the sliding block for the second cavity are provided on opposite sides of the second outlet.

15. The rubber fixing apparatus of claim 14, wherein each of the fixed blocks and each of the sliding blocks are provided obliquely; and wherein on the sliding block at the first outlet is provided with the positioning column, and on the fixed block at the second outlet is provided with another positioning column.

16. The rubber fixing apparatus of claim 1, further comprising a base plate, on which the storing device is mounted, and in which at least one mounting hole is provided for installing the base plate.

17. A coater, comprising:

the rubber fixing apparatus of claim 1; and a mounting table, on which the rubber fixing apparatus is detachably mounted.

* * * * *